Dec. 6, 1927.　　　　　　　　　　　　　　　　1,651,678
J. N. DAVIS
MACHINE FOR THE MANUFACTURE OF STORAGE BATTERY PLATES
Filed May 21, 1926　　　　4 Sheets-Sheet 1
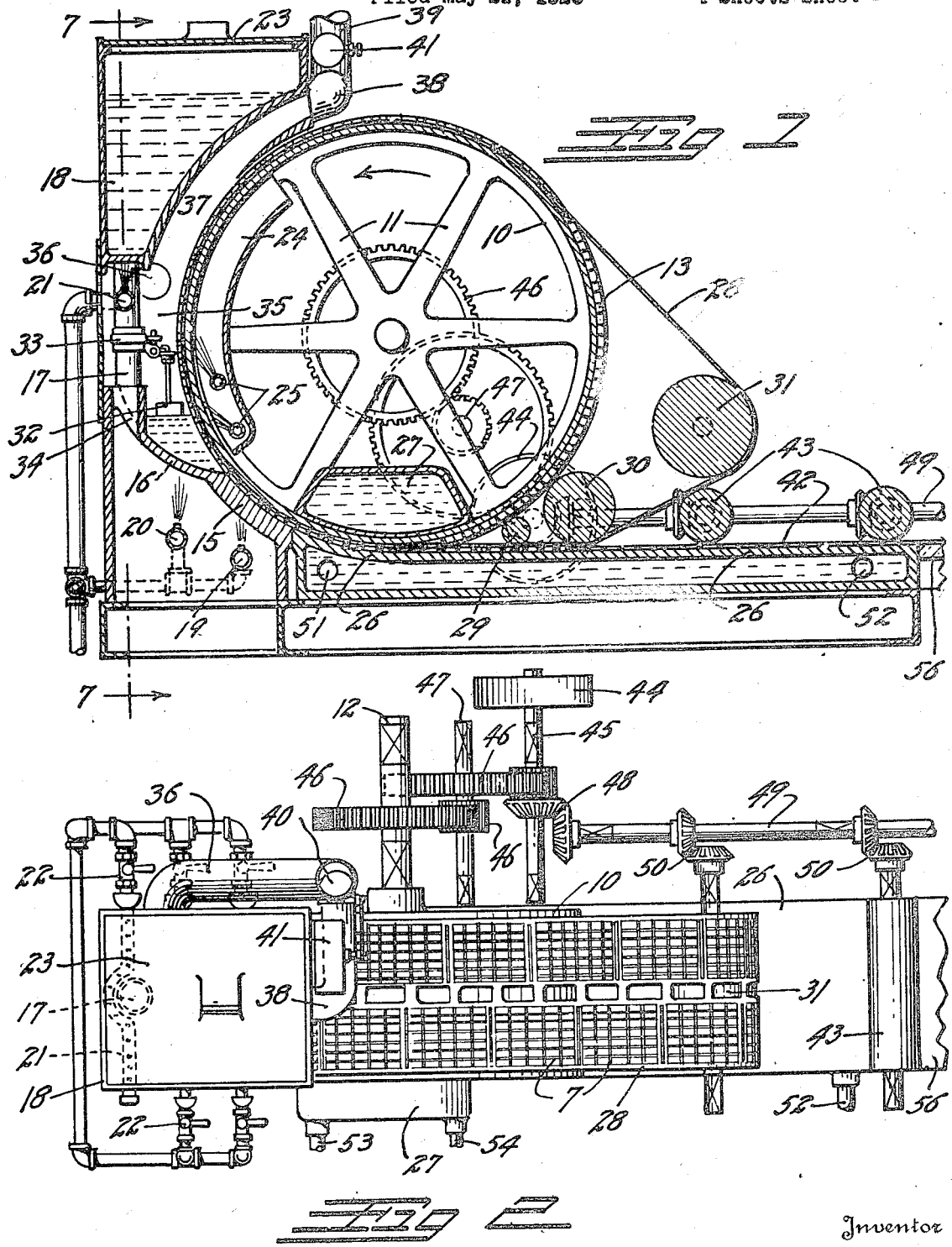
Inventor
JASPER N. DAVIS
Attorney

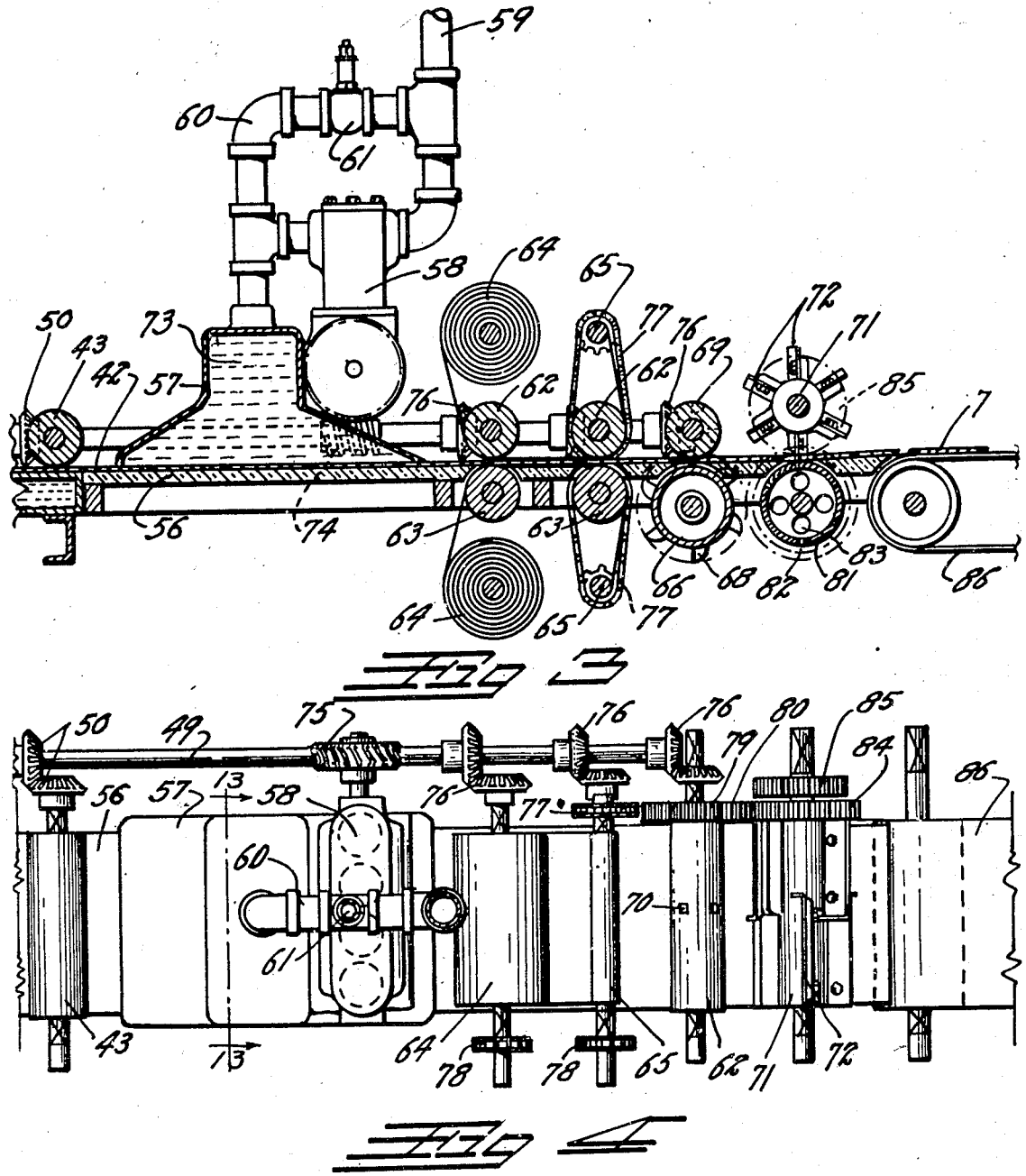

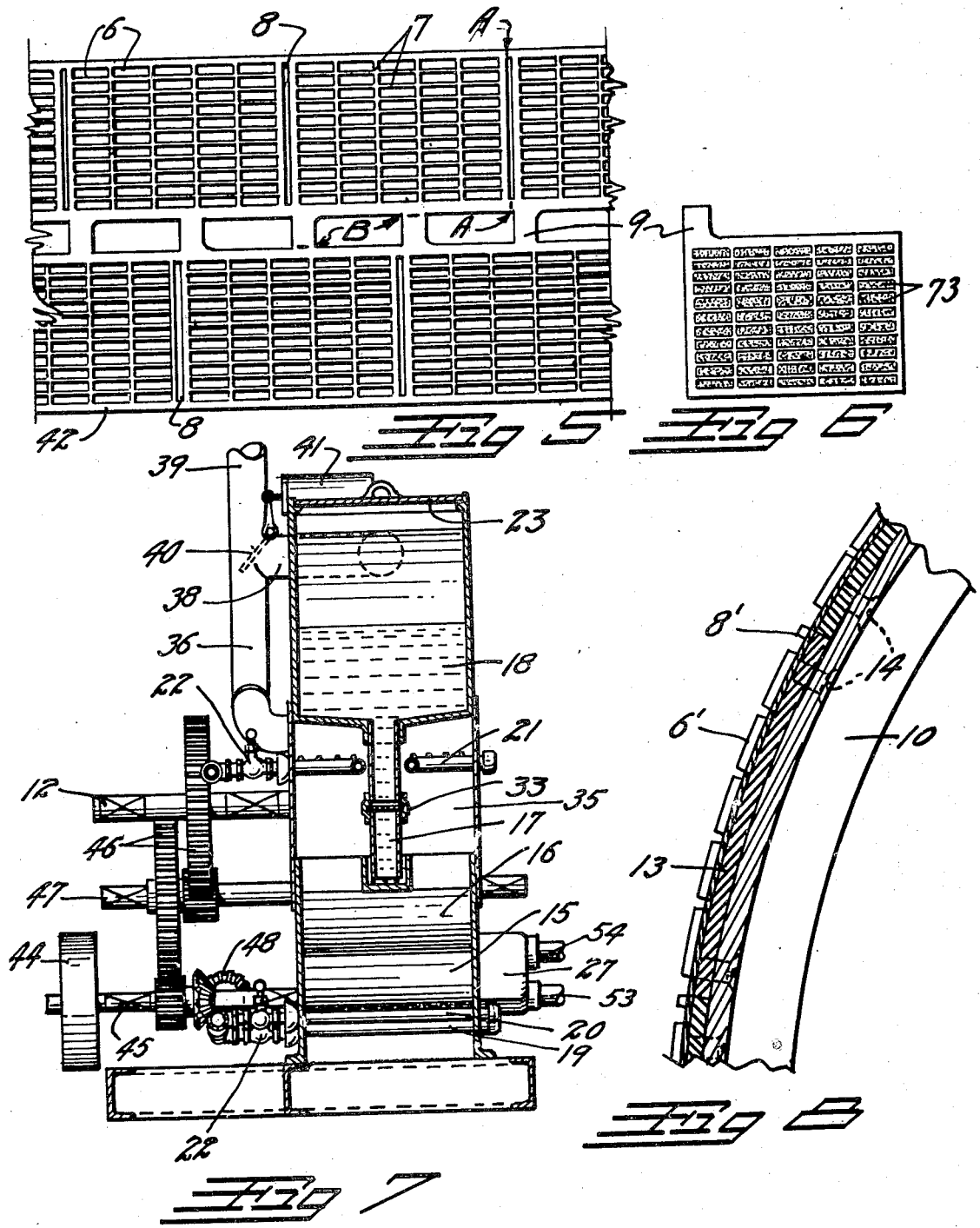

Dec. 6, 1927. 1,651,678
J. N. DAVIS
MACHINE FOR THE MANUFACTURE OF STORAGE BATTERY PLATES
Filed May 21, 1926 4 Sheets-Sheet 4
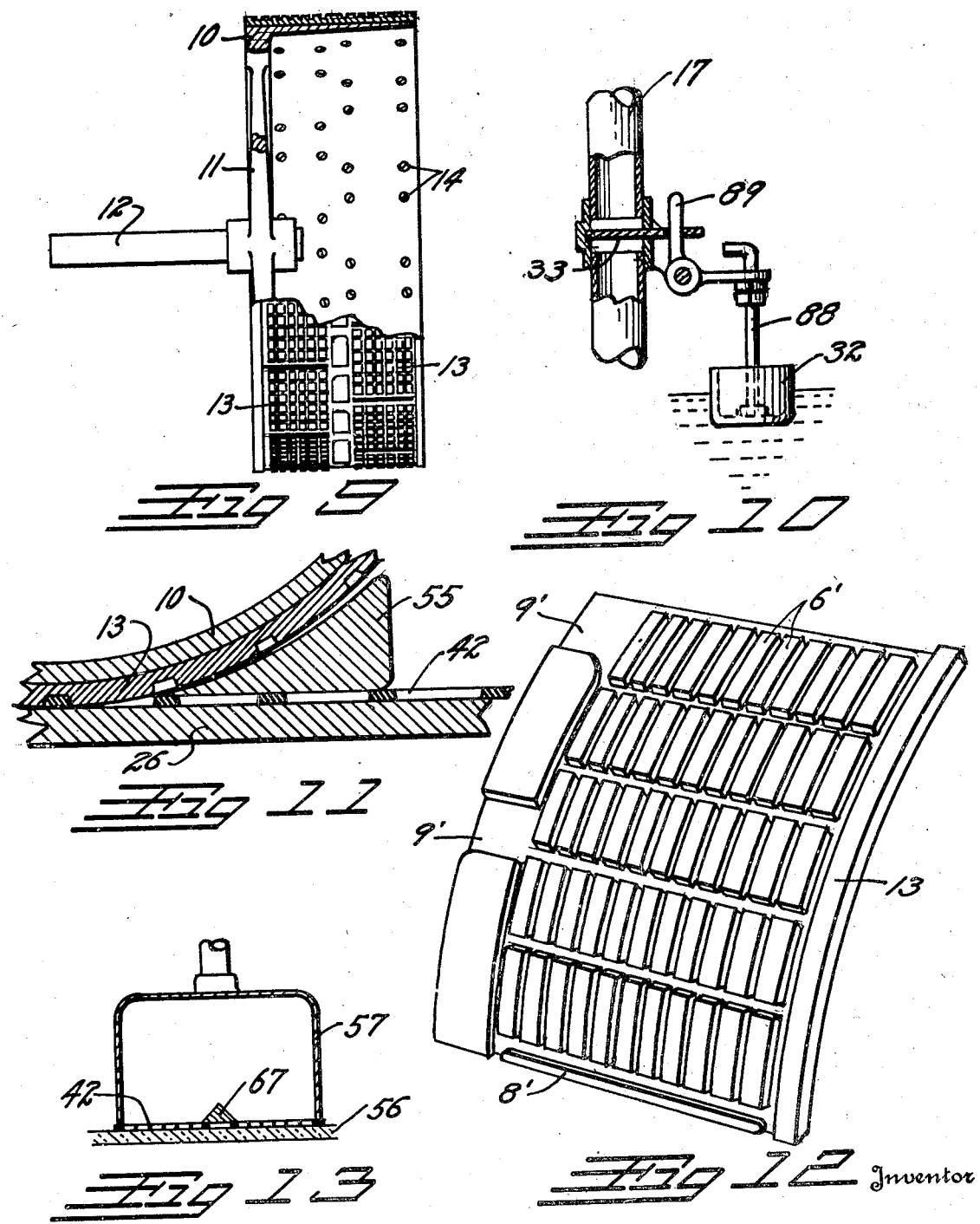

Patented Dec. 6, 1927.

1,651,678

UNITED STATES PATENT OFFICE.

JASPER N. DAVIS, OF DENVER, COLORADO.

MACHINE FOR THE MANUFACTURE OF STORAGE-BATTERY PLATES.

Application filed May 21, 1926. Serial No. 110,782.

This invention relates to a machine for manufacturing storage battery plates and has for its principal object, the provision of a machine which will carry through the complete process of forming a finished storage battery plate from the raw constituents.

Another object of the invention is to provide a casting machine which will form a continuous casting from molten metal.

Still another object is to cast a continuous, connected series of storage battery grids and provide efficient means for separating the individual grids from the series.

A further object is to provide means for pressing and rolling the active material into the grids in such a manner that it will not adhere to the pressing device.

A still further object resides in the efficient means employed for removing the grid castings from the mold wheel.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a vertical longitudinal section through the molding portion of the machine.

Fig. 2 is a plan view of the same.

Fig. 3 is a vertical longitudinal section through the packing and cutting portion of the device.

Fig. 4 is a plan view of the portion illustrated in Fig. 3.

Fig. 5 is a detail view illustrating the continuous grid as cast by the machine.

Fig. 6 illustrates a completed storage battery plate as formed by the machine.

Fig. 7 is a vertical cross section, taken on the line 7—7, Fig. 1.

Fig. 8 is a detail section through the rim of the molding wheel.

Fig. 9 is a detail side elevation, partly in section, of the molding wheel.

Fig. 10 is a detail view of the automatic metal valve employed in the machine.

Fig. 11 is a view of an alternate method for removing the grid casting from the molding wheel.

Fig. 12 is a detail view of one of the mold plates which are carried by the molding wheel.

Fig. 13 is a cross section through the pasting hood, taken on the line 13—13, Fig. 4.

Fig. 14 is a detail view illustrating how the thickness of the casting produced may be regulated.

The product of the molding portion of the machine is illustrated in detail in Fig. 5 and comprises a casting consisting of a series of grids 7 separated by narrow slots 8. The grids are perforated at 6 for the reception of the active material of the plate which is designated on the drawings by the numeral 73. From one upper corner of each grid 7, a terminal lug 9 extends. In the series, the upper portions of opposite grids face each other so as to form two continuous series of grids separated and joined by the terminal lugs 9.

On the drawing the supporting frame and bearings for the various shafts have been omitted for the sake of clearness. The positions of the various shaft bearings have been only conventionally indicated.

The molding wheel is designated in its entirety by the numeral 10, and comprises a drum which is open at one of its sides and supported by spokes 11 at its other side from the extremity of a shaft 12. The surface of the drum of the molding wheel is covered by a contacting series of mold plates 13, such as illustrated in Fig. 12. The mold plates 13 are attached to the drum by means of countersunk screws 14. The mold plates carry a reverse impression of the grids of the storage battery plates and have projections 6' and 8' for forming the perforations 6 and slots 8, respectively, and depressions 9' for forming the terminal lugs 9.

The mold plates 13 contact with a former 15 at one portion in the circumference of the mold wheel which closes the top of the depressions therein. Immediately above the former 15, a lead pot 16 is arranged which receives a constant supply of melted lead through a riser 17 from a lead reservoir 18. The level of the melted lead in the lead pot 16 is kept constant by means of a metal float 32 which controls a metal valve 33 in the riser 17, by means of a stem 88 and a lever 89, as illustrated in detail in Fig. 10.

The former 15, lead pot 16, and the reservoir 18 are heated by means of gas jets 19, 20 and 21, respectively, controlled by suitable gas valves 22. The gas jet 21 is offset around the riser 17, as illustrated in broken line, Fig. 2, and serves to keep the riser hot. The reservoir 18 is closed by a lid 23, the removal of which allows the lead pigs to be placed in the reservoir. On the interior of the mold wheel 10, a heater 24 is placed carrying gas jets 25.

Adjacent to the former 15, on the exterior of the wheel, a water jacketed cooling plate 26 is placed, through which, a constant current of cold water is maintained by the inlet and outlet openings 51 and 52, respectively. The interior of the molding wheel at this point is cooled by an interior water jacket 27 through which cold water flows between a feed pipe 53 and a discharge pipe 54.

A perforated stripping band 28 passes around a portion of the molding wheel 10 and over a stripping roller 29, a smoothing roll 30 and an idler roll 31. The stripping band is perforated to the exact design of the casting to be formed upon the molding wheel, that is to the design illustrated in Fig. 5. The projections on the mold extend through the perforations to contact with the former 15 and the cooling plate 26.

The hot gases from the gas jets 19 and 20 rise through a chimney 34 into a hot air chamber surrounding the riser 17. From here the gases may be drawn through a side stack 36 or upwardly along the periphery of the molding wheel and under the reservoir 18 through a passage 37 into a front stack 38. The side and front stacks join in a common stack 39, the junction being controlled by means of an automatic damper 40 operated from any of the common thermostatic damper controls 41. Should the periphery of the molding wheel be too hot, the control 41 will act to cause the damper 40 to shut off the front stack 38 and take the heated gases through the side stack 36. Should the molding wheel be too cool, the damper 40 will be similarly actuated to shut off the side stack and allow the heated gases to flow through the passage 37.

In operation, the molding wheel rotates in an anticlockwise direction, as indicated by the arrow in Fig. 1. The melted lead from the lead pot 16 flows into the interstices between the projections on the mold plates 13 between the former 15 and the mold wheel 10. The mold wheel at this point is hot, it having been heated by the heater 24 and the hot air chamber 35 and the former 15 is also hot which facilitates the flow of the metal into the molds. As the wheel rotates, the fluid casting will be carried between the cooling plate 26 and the interior water jacket 27 where it will be cooled sufficiently to solidify. The continuous solid casting is now drawn from the mold wheel by the stripping band 28 and caused to travel along the surface of the cooling plate 26 where it will be further cooled. After leaving the stripping band the casting 42 passes under a series of pressing or smoothing rolls 43, which iron out any irregularities, and to the pasting machine, which will be later described.

The entire machine may be driven from a belt pulley 44 on a drive shaft 45. The drive shaft 45 communicates, through a series of spur reduction gears 46 and a jack shaft 47, with the mold wheel shaft 12, and through bevel gears 48, with a countershaft 49. The countershaft 49 extends throughout the length of the machine and drives the smoothing rolls 43 through the medium of pairs of bevel gears 50.

In Fig. 11, I have illustrated an alternate method for stripping the casting 42 from the mold wheel. In this method, the stripping band 28 is eliminated and a stationary wedge-shaped stripper 55 is placed at the point where the mold wheel separates from the cooling plate 26. The stripper 55 acts to pry the casting away from the mold wheel onto the cooling plate.

The casting 42 travels from the cooling plate 26 onto a pasting table 56 formed of glass or similar acid-resisting material. Immediately above the forward extremity of the pasting table 56, a pasting hood 57 is placed which extends over the entire width of the perforated portion of the casting 42. A partition 67 is placed in the bottom of the pasting hood 57 immediately over the path of the terminal lugs 9 so as to prevent paste from entering the open spaces between the terminal lugs.

The active material or paste for the battery plates is forced into the pasting hood 57 under considerable pressure, by a force pump 58 from any suitable paste supply 59. The pump 58 is provided with a by-pass 60 having a spring loaded valve 61. From the pasting hood 57, the paste 73 flows into the perforations 6 in the casting 42 under pressure. Should the casting 42 not carry the paste from the pasting hood as fast as it flows from the pump 58, the paste will return through the by-pass 60 to the paste supply 59. The pressure in the pasting hood 57 can be therefore adjusted by varying the adjustment of the spring loaded valve 61. The pasting hood 57, the pump 58, the valve 61 and the paste piping are either formed or lined with lead or similar acid-resisting material to withstand the corrosive effect of the acid contained within the paste.

From the pasting hood, the casting 42 flows between pairs of packing rolls 62 and 63 arranged above and below, respectively, of the pasting table, which pack the paste firmly into the plates. To prevent the paste from adhering to the packing rolls, rolls of paper 64 are arranged above and below the pasting table 56. This paper travels between the packing rolls 62 and 63 and the casting onto power driven receiving rolls 65. The receiving rolls 65 should be provided with any of the usual clutch devices commonly employed in the paper industry to allow them to slow down as the diameter of the roll of paper on them increases.

The smoothing rolls 43 and the packing rolls 62 and 63 are timed to move in synchronism with the travel of the casting so that they act to draw the casting through the machine, assisted by the ejecting action of the mold wheel 10. The travel of the casting, however, is made positive by a drag wheel 66 having teeth 68 which engage the terminal lugs 9 of the casting and act to draw it through the entire device. The casting is maintained against the drag wheel 66 by a drag wheel roller 69 having depressions 70 for the reception of the teeth 68.

From the drag wheel 66, the casting travels to a rotary shear 71 having blades 72 arranged to separate the casting into individual storage battery plates such as illustrated in Fig. 6. The blades 72 are arranged to punch through the casting at the extremities of the slots 8 in the position indicated at A, Fig. 5, and to make a staggered punching longitudinally of the casting at the extremities of the terminal lugs, in the positions indicated at B, Fig. 5. The result is the completed plate of Fig. 6. From the rotary shear, the separated individual plates travel onto a belt conveyor 86 which carries them to the pickling vat commonly used in the art.

The casting is maintained against the shear 71 by a shear drum 81 arranged below the casting and having slots 82 for the reception of the blades 72. The shear drum 81 is hollow and receives its punching on its interior. These punchings gradually work through openings 83 in the extremities of the drums.

The pump 58 may be driven from the countershaft 49 through a worm 74 and worm gear 75. The packing rolls 62 and 63 and the drag wheel roll 69 are driven from the countershaft by means of miter gears 76. The receiving rolls 65 are driven by means of chains 77 from the packing rolls 62 and 63. The packing rolls 62 and 63 are caused to operate in unison with their mates by means of chains 78. The drag wheel 66 is driven from the shaft of the roller 69 through the medium of a spur pinion 79 which meshes with a gear 80 on the drag wheel shaft. The gear 80 meshes with a similar sized gear 84 on the shaft of the shear drum 81, thus causing the shear drum to move in unison with the drag wheel 66. The rotary shear 71 and its shear drum 81 move in unison through the medium of similar sized spur gears 85.

In Fig. 14, I have illustrated a method whereby the thickness of the casting produced may be diminished by inserting a shim 90 in the bottom of the mold cavities. The shim 90 is punched out to a similar outline as the casting and stripping band 28, and remains within the mold during the casting operation, thereby subtracting its thickness from the depth of the mold.

Provision for taking up wear between the mold wheel 10 and the former 15 and cooling plate 26 should be incorporated in a complete machine as should also adjusting means for separating the rolls to accommodate a thicker casting. The matters however are all matters of standard practice within the skill of any mechanic and detailed description thereof is deemed an unnecessary encumbrance to this specification.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A machine for manufacturing a continuous series of castings comprising a wheel; a series of molds carried by said wheel; a container arranged to maintain molten metal against said molds as they rotate; cooled surfaces adjacent said molds adapted to cool said metal in said molds as they leave said container therein; and means for separating the cooled casting from said molds, said means comprising a band adapted to lie in said molds during a portion of their rotation and be drawn from said molds during another portion.

2. Means for manufacturing continuous castings comprising a rotating drum, arcuate molds carried by said drum; a former maintained in contact with said molds; a metal receptacle adjacent said former and adapted to maintain molten metal in said molds as they pass therethrough; cooled surfaces adjacent said molds and adapted to cool same as they leave said former; and a continuous band adapted to lie in said molds as they enter said metal container and be drawn from said molds after the cooling has taken place.

3. In a casting machine having a rotating casting drum; a secondary reservoir adapted to maintain molten metal against said drum; a main reservoir above said secondary reservoir and spaced from said drum; heating means for both said secondary reservoir and said main reservoir; a heat passage between said main reservoir and said drum so as to transmit heat from said heating means to both said main reservoir and said drum; and means for passing molten metal from said main reservoir to said secondary reservoir.

4. In a continuous casting machine having an endless, rotating series of molds and means for placing metal in said molds, means for pre-heating said molds before said metal is received therein, said means comprising a heating passage on the interior of said series of molds, said passage being open at one face to the back of said molds; and means for supplying heat to said passage.

5. In a continuous casting machine having an endless, rotating series of molds, a receiving plate arranged at a tangent to said series; an endless band having openings to allow it to lie in said molds; and rollers arranged within said band so as to separate it from said molds over said receiving plate.

6. Means for extracting castings from molds comprising a relatively thin medium having a shape conforming to the shape of the molds and adapted to be placed in the bottom thereof, and means for withdrawing said medium from said molds so as to remove the casting from the molds.

In testimony whereof, I affix my signature.

JASPER N. DAVIS.